US012109802B2

(12) United States Patent
Tokuda

(10) Patent No.: US 12,109,802 B2
(45) Date of Patent: Oct. 8, 2024

(54) PRINTING DEVICE AND PRINTING METHOD

(71) Applicant: CASIO COMPUTER CO., LTD., Tokyo (JP)

(72) Inventor: Yusuke Tokuda, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 131 days.

(21) Appl. No.: 17/887,682

(22) Filed: Aug. 15, 2022

(65) Prior Publication Data

US 2023/0102257 A1 Mar. 30, 2023

(30) Foreign Application Priority Data

Sep. 24, 2021 (JP) ................................ 2021-155085

(51) Int. Cl.

*B41J 11/04* (2006.01)
*B41J 2/32* (2006.01)
*B41J 11/70* (2006.01)

(52) U.S. Cl.

CPC ................ *B41J 11/04* (2013.01); *B41J 2/32* (2013.01); *B41J 11/70* (2013.01)

(58) Field of Classification Search

CPC ... B41J 11/70; B41J 3/4075; B41J 2/32; B41J 2/04; B41J 2/042; B41J 15/042; B41J 15/044; B41J 15/046

See application file for complete search history.

(56) References Cited

U.S. PATENT DOCUMENTS

| | | | | |
|---|---|---|---|---|
| 10,336,104 | B2 | 7/2019 | Yasuki | |
| 2012/0044313 | A1* | 2/2012 | Yamada | B41J 25/316 347/197 |
| 2015/0015658 | A1* | 1/2015 | Murata | B41J 15/044 347/218 |
| 2022/0153041 | A1* | 5/2022 | Tanabe | B41J 11/04 |

FOREIGN PATENT DOCUMENTS

| | | | | |
|---|---|---|---|---|
| CN | 114401846 A * | 4/2022 | | B41J 11/663 |
| JP | 2018144250 A | 9/2018 | | |

OTHER PUBLICATIONS

Tanabe, Machine TranslationofCN-114401846-A, 2022 (Year: 2022).*

* cited by examiner

*Primary Examiner* — Scott A Richmond
(74) *Attorney, Agent, or Firm* — Holtz, Holtz & Volek PC

(57) ABSTRACT

A printing device includes a printer including a printing head to print a printing subject on a printing medium; a transporter including a roller to, while pressing the printing medium against the printing head, transport the printing medium in a feeding direction and a retracting direction; and a presser to, when the printing medium is transported in a feeding direction, cause the roller to press the printing medium against the printing head with first pressure and, when the printing medium is transported in a retracting direction, cause the roller to press the printing medium against the printing head with second pressure different from the first pressure.

11 Claims, 14 Drawing Sheets

PRINTING DEVICE AND PRINTING METHOD

CROSS-REFERENCE TO RELATED APPLICATION

This application claims the benefit of Japanese Patent Application No. 2021-155085, filed on Sep. 24, 2021, the entire disclosure of which is incorporated by reference herein.

FIELD

This application relates generally to a printing device and a printing method.

BACKGROUND

A printing device that prints a printing subject, such as a character, a symbol, a logo, an emoji, and a mark, on a tape-shaped printing medium is disclosed in Unexamined Japanese Patent Application Publication No. 2018-144250. This printing device includes a thermal print head and prints a printing subject by, while transporting a tape-shaped printing medium, transferring ink applied to a ribbon onto the printing medium by heat. The printing medium on which the printing subject was printed is cut by a cutter.

SUMMARY

One aspect of a printing device of the present disclosure includes

- a printer including a printing head to print a printing subject on a printing medium;
- a transporter including a roller to, while pressing the printing medium against the printing head, transport the printing medium in a feeding direction and a retracting direction; and
- a presser to,
  - when the printing medium is transported in a feeding direction, cause the roller to press the printing medium against the printing head with first pressure and,
  - when the printing medium is transported in a retracting direction, cause the roller to press the printing medium against the printing head with second pressure different from the first pressure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a printing system and a printing device according to an embodiment for embodying the present disclosure are described with reference to the drawings.

Figure 1:
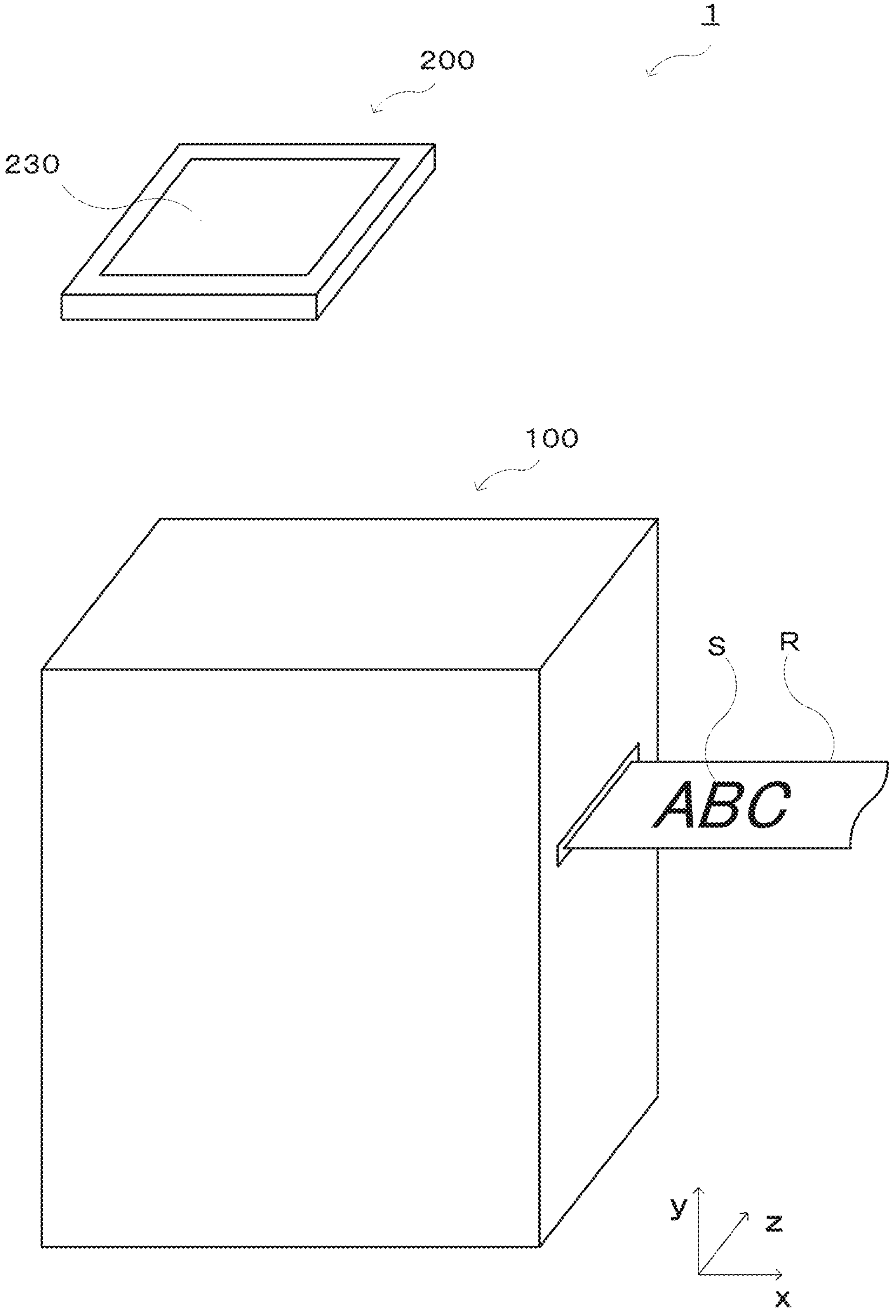
FIG. 1 is a diagram illustrating a printing system according to an embodiment of the present disclosure.

A printing system 1 according to the present embodiment is, as illustrated in FIG. 1, a system that prints a printing subject S, such as a character, a symbol, a logo, an emoji, and a mark, on a tape-shaped printing medium R. The printing system 1 includes a printing device 100 and a terminal device 200. The printing device 100 is a thermal transfer type printer that transfers ink applied to a ribbon onto a printing medium R by heat. The terminal device 200 includes a display 230 and is configured by, for example, a smartphone or a tablet personal computer (PC). The printing device 100 and the terminal device 200 are configured to be communicable with each other via a wireless link, and the terminal device 200 sends data indicating a printing subject S to the printing device 100.

To facilitate understanding, a Cartesian coordinate system having a direction in which the printing medium R is transported as the x-direction, a direction perpendicular to the printing medium R as the y-direction, and a direction perpendicular to the x-direction and the y-direction as the z-direction is set, and the Cartesian coordinate system is referred to as appropriate.

Figure 2:
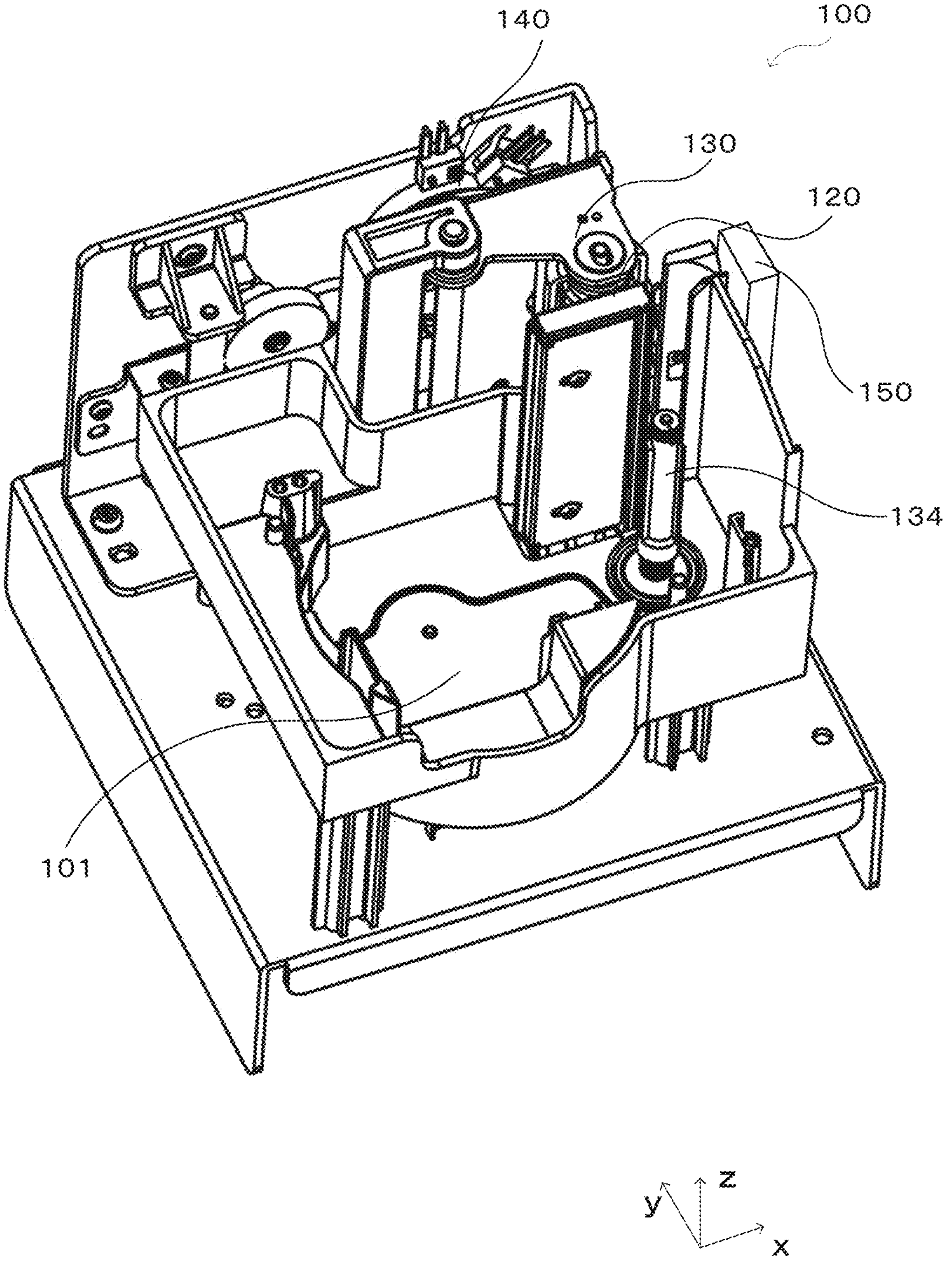
FIG. 2 is a diagram illustrating a printing device according to the embodiment of the present disclosure.

The printing device 100 includes, as illustrated in FIG. 2, a cartridge housing 101, a printer 120, a transporter 130, a presser 140, and a cutter 150.

Figure 3:
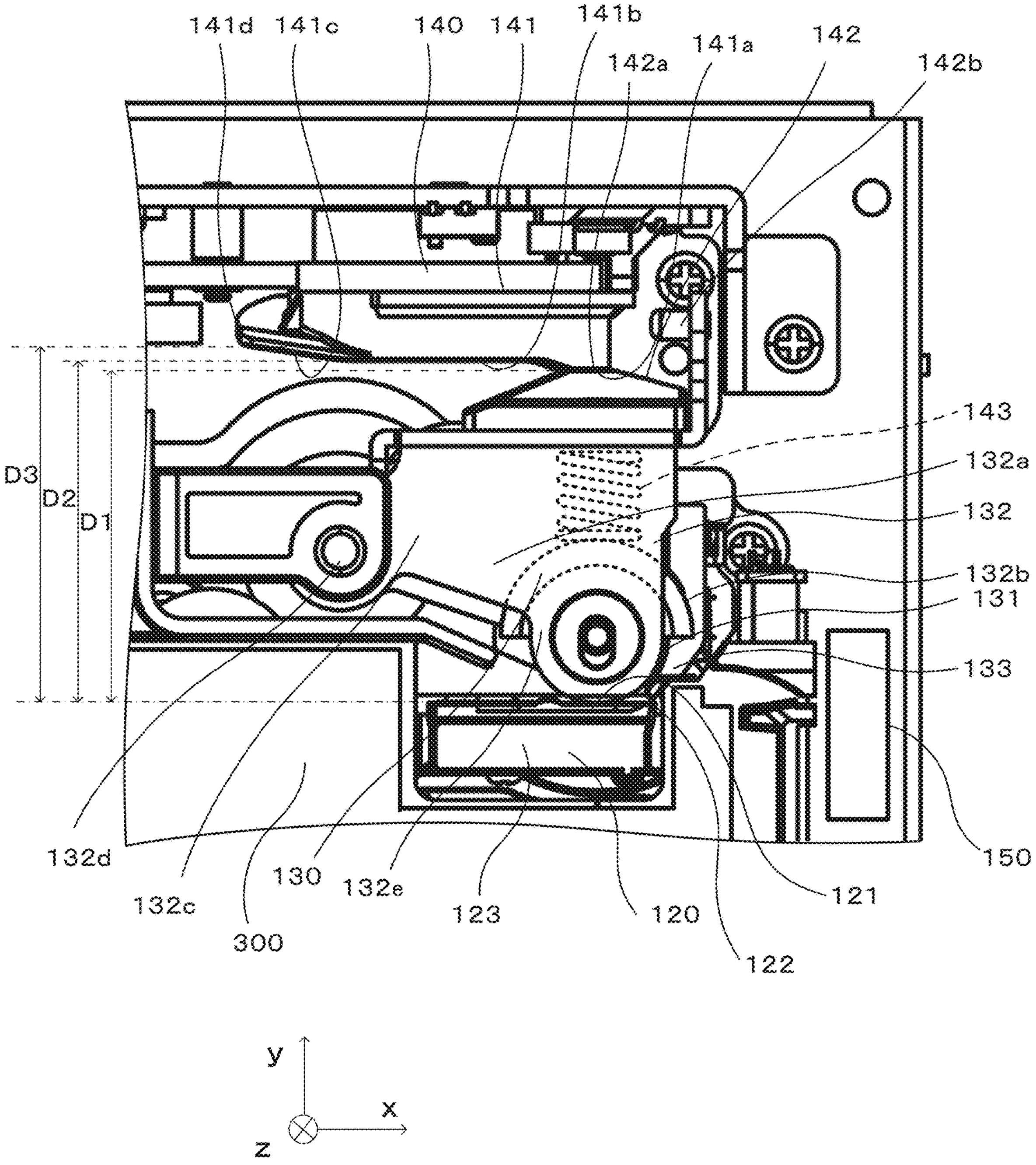
FIG. 3 is a front view illustrating the printing device according to the embodiment of the present disclosure.

The cartridge housing 101 is, as illustrated in FIG. 3, a part that houses a cartridge 300 in which a tape-shaped printing medium R and a ribbon to which ink is applied are rolled into a roll shape and housed. The printing medium R includes, for example, paper or resin to which adhesive is applied and release paper.

The printer 120 is a component that includes a printing head 121 and a lower guide 122 and prints a printing subject S on the tape-shaped printing medium R. The printing head 121 is, in order to increase rigidity, attached to a fixing portion 123, which is made of metal by aluminum die-casting or the like. The printing head 121 includes a thermal print head in which, on a substrate made of alumina ceramic or the like, a plurality of heating resistors is arranged in a line shape. The printing head 121 performs printing by selectively causing a plurality of heating resistors to generate heat through energization corresponding to a printing subject S and transferring ink applied to the ribbon onto the printing medium R by heat. The lower guide 122 is a heat sink produced from a metal having a high thermal conductivity and is arranged at a location between the printing head 121 and the cutter 150 and in the vicinity of the printing head 121. This configuration can cause the lower guide 122 to guide the printing head 121, the printing medium R, and the ribbon and cool the the printing medium R and the ribbon, which were heated by the printing head 121.

The transporter 130 is a component that includes a roller 131, a roller support 132, a tape guide 133, and a winding shaft 134 illustrated in FIG. 2 and transports the printing medium R in a feeding direction (x-direction) and a retracting direction (−x-direction). The transporter 130 also transports the ribbon, to which ink is applied, in conjunction with the printing medium R.

The roller 131 includes a platen roller that has a core metal made of metal and resin formed around the core metal, and rotates driven by a servo motor or the like. The motor that drives the roller 131 is not limited to a servo motor and may be a stepping motor or a direct current (DC) motor. The roller 131 presses the printing medium R against the printing head 121 and, at the same time, transports the printing medium R.

The roller support 132 includes an arm 132*a* and a roller axial support 132*b*. The arm 132*a* has one end 132*c* axially supported by a rotation shaft 132*d* in a rotatable manner, and, at the other end 132*e* of the arm 132*a*, the roller axial support 132*b* is attached. The arm 132*a* rotating about the rotation shaft 132*d* as the center causes the roller axial support 132*b* to move in the y-direction or the −y-direction. The roller axial support 132*b* axially supports the roller 131 in a rotatable manner.

Figure 4:
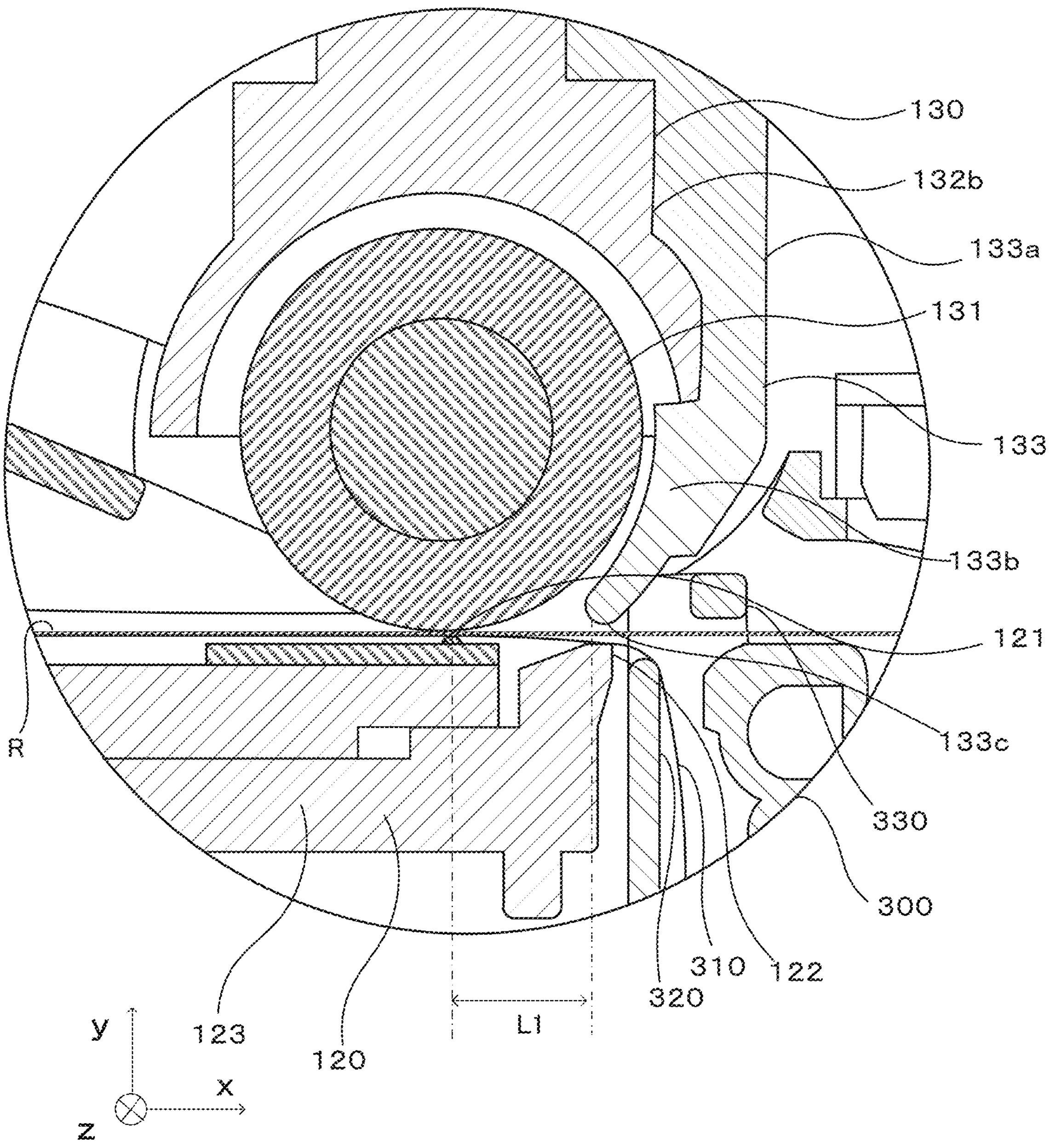
FIG. 4 is an enlarged cross-sectional view illustrating the printing device according to the embodiment of the present disclosure.

The tape guide 133 includes, as illustrated in FIG. 4, a fixed portion 133*a*, a curved portion 133*b*, and a tip portion 133*c*. The tape guide 133 is a component that is arranged at a location on the forward side in the feeding direction of the roller 131 (between the roller 131 and the cutter 150) and in the vicinity of the roller 131 and prevents the printing medium R from bending. The fixed portion 133*a* is fixed to the roller axial support 132*b* in order to arrange the tape guide 133 at a location that is fixed with respect to the roller 131. The curved portion 133*b* has one end fixed to the fixed portion 133*a* and has a curved shape in order not to prevent rotation of the roller 131. The tip portion 133*c* is arranged at the other end of the curved portion 133*b* and arranged at a location at which the tip portion 133*c* comes into contact with the printing medium R when the printing medium R bends. Length L1 from the printing head 121 to the tip portion 133*c* is, for example, 5 mm. In addition, the tape guide 133 has the tip portion 133*c* arranged facing the above-described lower guide 122 and has a space formed between the tip portion 133*c* and the lower guide 122. This configuration can cause the printing medium R and a ribbon 310 to pass between the tip portion 133*c* of the tape guide 133 and the lower guide 122 and prevent the printing medium R and the ribbon 310 from bending.

The winding shaft 134 illustrated in FIG. 2 winds up the ribbon 310, to which ink is applied, and transports the ribbon 310 in conjunction with the printing medium R in the feeding direction. Lest the ribbon 310 be caused to bend, rotation speed of the winding shaft 134 is adjusted to a rotation speed at which tension can be applied to the ribbon 310. The rotation speed of the winding shaft 134 is, for example, set higher than rotation speed of the roller 131, and the rotation speed of the winding shaft 134 is preferably set to greater than or equal to 1.1 times the rotation speed of the roller 131. When the printing medium R is transported in the retracting direction, the winding shaft 134 is rotated without resistance, and the ribbon 310 is transported in conjunction with the printing medium R in the retracting direction.

The presser 140 includes, as illustrated in FIG. 3, a cam 141, a cam follower 142 that is moved by the cam 141, and an elastic body 143 that is arranged between the cam follower 142 and the roller support 132. The presser 140 is a device that causes the roller 131 to press the printing medium R against the printing head 121, and causes the roller 131 to press the printing medium R against the printing head 121 with first pressure or second pressure that is smaller than the first pressure. Specifically, when the printing medium R is transported in the feeding direction, the presser 140 causes the roller 131 to press the printing medium R against the printing head 121 with the first pressure. The first pressure is, for example, 500 gf/cm. This configuration can cause a printing subject S to be clearly printed on the printing medium R. When the printing medium R is transported in the retracting direction, the presser 140 causes the roller 131 to press the printing medium R against the printing head 121 with the second pressure. The second pressure is, for example, 360 gf/cm. This configuration can suppress a load on the printing medium R and the ribbon 310 at the time of transportation and enables stable transportation. Reducing a load on the printing medium R and the ribbon 310 enables ribbon wrinkles and ribbon breakage to be prevented from occurring. Note that the first pressure and the second pressure are expressed as force per unit length in the axial direction of the roller. When the cartridge 300 is replaced, the presser 140 causes the roller 131 to move away from the printing head 121.

The cam 141 rotates about a rotation axis extending in the y-axis direction as the center driven by a stepping motor or the like and includes a first cam surface 141*a*, a second cam surface 141*b*, and a third cam surface 141*c*. Distance D1 between the first cam surface 141*a* and the printer 120 is smaller than distance D2 between the second cam surface 141*b* and the printer 120. The distance D2 between the second cam surface 141*b* and the printer 120 is smaller than distance D3 between the third cam surface 141*c* and the printer 120. In addition, the third cam surface 141*c* includes a fitting portion 141*d*. Although, herein, an example in which the cam 141 rotates about the rotation axis extending in the y-axis direction as the center is described, the direction of the rotation axis of the cam 141 and the shape of the cam 141 may be a direction and a shape other than the direction and the shape described herein, respectively.

Figure 5:
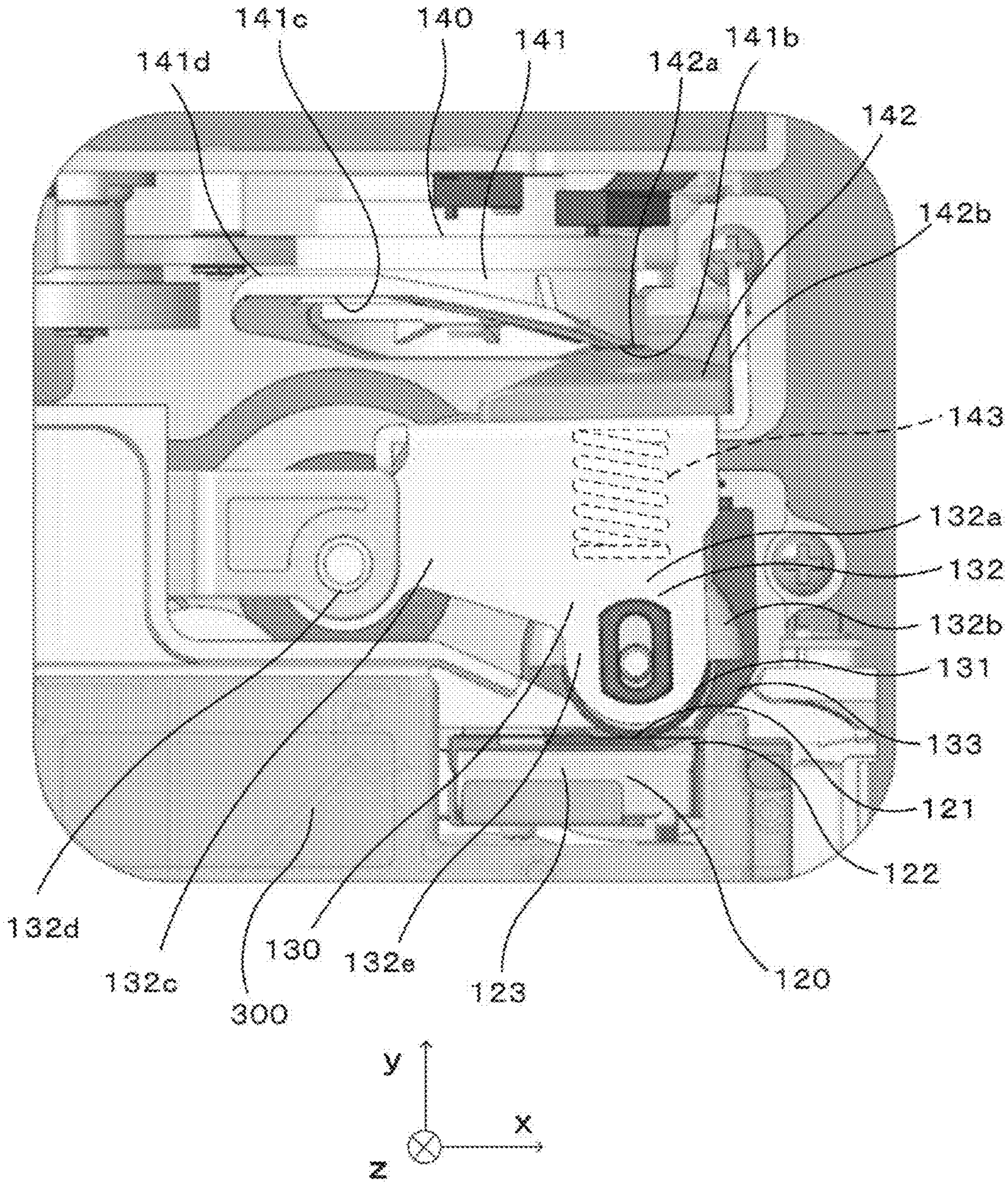
FIG. 5 is a diagram illustrating movement of a cam of the printing device according to the embodiment of the present disclosure (part 1)
Figure 6:
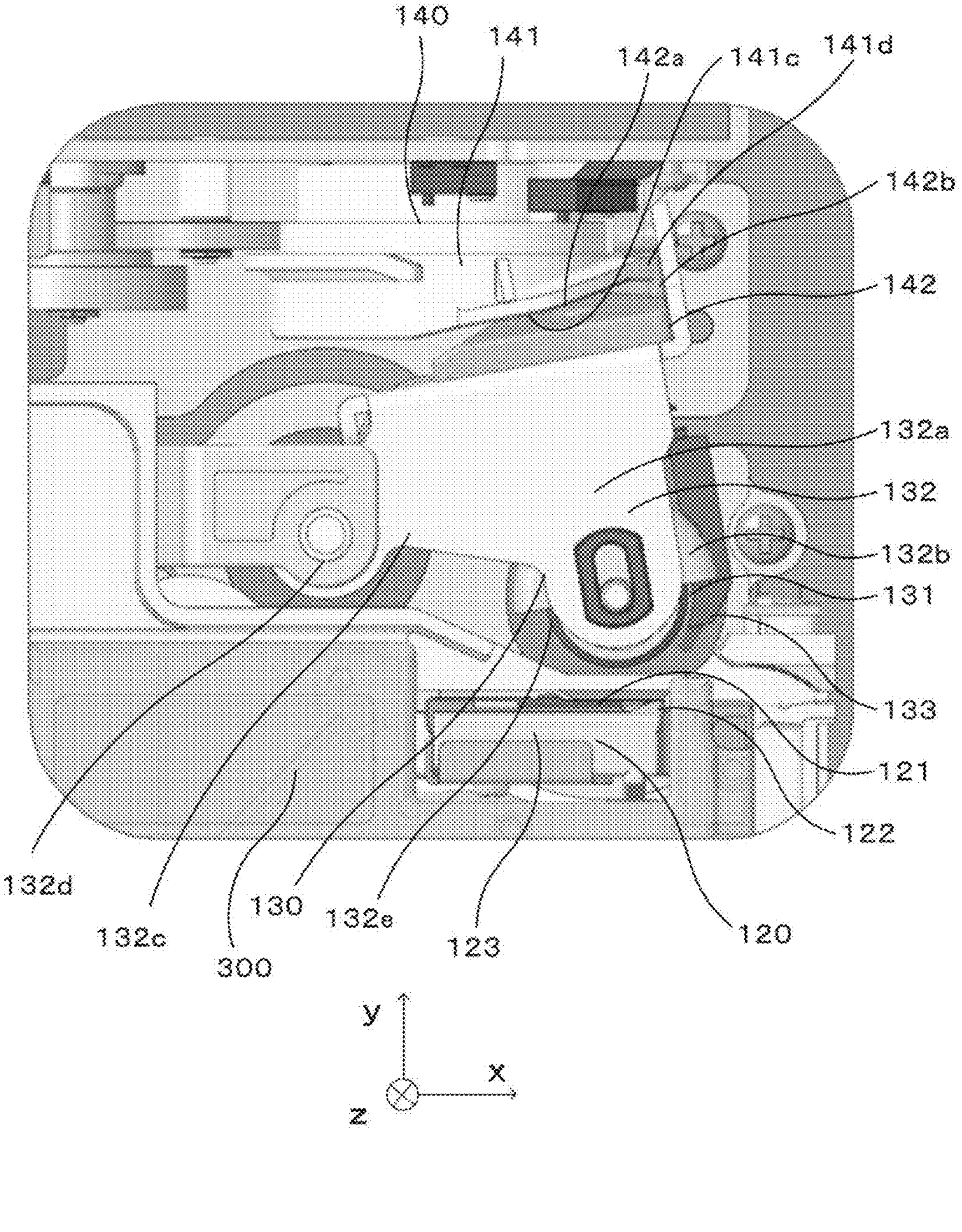
FIG. 6 is another diagram illustrating the movement of the cam of the printing device according to the embodiment of the present disclosure (part 2)

The cam follower 142 includes a contacting portion 142*a* and a fitted portion 142*b* that is fitted to the fitting portion 141*d*, and moves in the y-direction or the −y-direction pressed by the cam 141. When the contacting portion 142*a* of the cam follower 142 is in contact with the first cam surface 141*a*, the roller axial support 132*b* is biased by the elastic body 143, and the roller 131 presses the printing medium R against the printing head 121 with the first pressure. When, as illustrated in FIG. 5, the contacting portion 142*a* of the cam follower 142 is in contact with the second cam surface 141*b*, the roller support 132 is biased by the elastic body 143, and the roller 131 presses the printing medium R against the printing head 121 with the second pressure. When, as illustrated in FIG. 6, the contacting portion 142*a* of the cam follower 142 is in contact with the third cam surface 141*c*, the fitted portion 142*b* is fitted to the fitting portion 141*d*, and the roller 131 moves away from the printing head 121.

The elastic body 143 is a component that is arranged between the cam follower 142 and the roller axial support 132*b* and biases the roller support 132, and examples of the elastic body 143 include a plate spring and a coil spring.

The cutter 150 cuts the tape-shaped printing medium R, on which a printing subject S is printed by the printer 120. The cutter 150 includes a cutting blade and a driver to drive the cutting blade. Distance from the printing head 121 to the cutter 150 is, for example, 20 mm.

Figure 7:
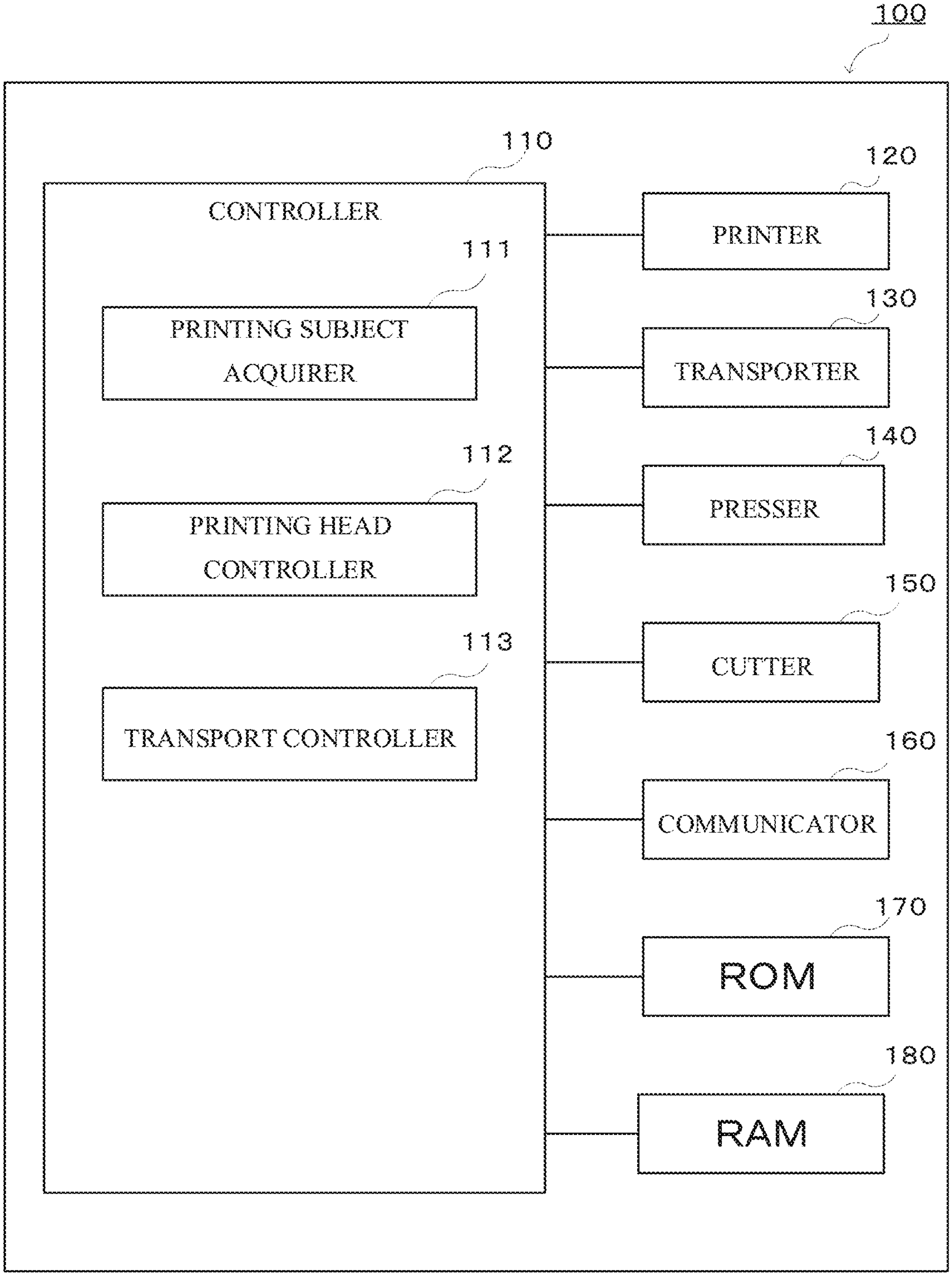
FIG. 7 is a block diagram illustrating a configuration of the printing device according to the embodiment of the present disclosure.

The printing device 100 includes, as an electronic configuration, a controller 110, a communicator 160, a read only memory (ROM) 170, and a random access memory (RAM) 180, in addition to the above-described printer 120, transporter 130, presser 140, and cutter 150, as illustrated in FIG. 7.

The controller 110 includes a central processing unit (CPU) and the like. The controller 110 functions as a printing subject acquirer 111, a printing head controller 112, and a transport controller 113 by executing programs stored in the ROM 170.

The printing subject acquirer 111 acquires, via the communicator 160, data of a printing subject sent from the terminal device 200 and causes the RAM 180 to store the acquired data.

The printing head controller 112 controls, based on a transport distance by which the transporter 130 has transported the printing medium R in the feeding direction, the printer 120 and thereby causes the printer 120 to print a printing subject S on the printing medium R. Specifically, every time the printing medium R is transported in a sub-scan direction by a distance equivalent to one dot pitch, the printing head controller 112 causes the printing head 121 to print one dot line, which is a line of pixels that are arranged in a line shape in a main-scan direction, in an image of the printing subject S stored in the RAM 180.

The transport controller 113 controls the transporter 130, the presser 140, and the cutter 150 to transport the printing medium R in the feeding direction and the retracting direction and cut the printing medium R on which printing is performed. Specifically, when printing an image while transporting the printing medium R in the feeding direction, the transport controller 113 controls the presser 140 to cause the roller 131 to press the printing medium R against the printing head 121 with the first pressure and subsequently controls the transporter 130 to transport the printing medium R and the ribbon 310 in the feeding direction. After having printed the printing subject S on the printing medium R, the transport controller 113 controls the transporter 130 to transport the printing medium R in the feeding direction until a planned cutting position of the printing medium R is arranged at the location of the cutting blade of the cutter 150. Subsequently, the transport controller 113 controls the cutter 150 to cut the printing medium R at the planned cutting position. Subsequently, the transport controller 113 controls the presser 140 to cause the roller 131 to press the printing medium R against the printing head 121 with the second pressure and subsequently controls the transporter 130 to retract the printing medium R. On this occasion, the transporter 130 preferably retracts the printing medium R to a location at which the tip portion of the printing medium R, on which printing is to be performed, is arranged at a location on the forward side in the feeding direction of the tape guide 133 (between the tape guide 133 and the cutter 150) and in the vicinity of the tape guide 133. Subsequently, when a printing subject S to be printed next is printed on the printing medium R, the transport controller 113 controls the presser 140 to cause the roller 131 to press the printing medium R against the printing head 121 with the first pressure and controls the transporter 130 to transport the printing medium R and the ribbon 310 in the feeding direction. When the cartridge 300 is to be replaced, the transport controller 113 controls the presser 140 to cause the roller 131 to move away from the printing head 121.

The printer 120, as described above, selectively causes the heating resistors, which are formed on the printing head 121, to generate heat according to printing data, based on control by the printing head controller 112. The heating resistors that have generated heat transfer ink applied to the ribbon 310 onto the printing medium R, and pixels arranged in a line shape in the main-scan direction of the printing head 121 (one dot line) are printed.

The transporter 130, as described above, transports the printing medium R in the feeding direction and the retracting direction with the printing medium R pressed against the printing head 121, based on control by the transport controller 113. In addition, based on the control by the transport controller 113, the transporter 130, by rotating the winding shaft 134, transports the ribbon 310, to which ink is applied, in conjunction with the printing medium R.

The presser 140, as described above, rotates the cam 141, based on the control by the transport controller 113, and, when the printing medium R is transported in the feeding direction, causes the roller 131 to press the printing medium R against the printing head 121 with the first pressure, and, when the printing medium R is transported in the retracting direction, causes the roller 131 to press the printing medium R against the printing head 121 with the second pressure. When the cartridge 300 is replaced, the presser 140 rotates the cam 141, based on the control by the transport controller 113 and causes the roller 131 to move away from the printing head 121.

The cutter 150, as described above, cuts, based on the control by the transport controller 113, the tape-shaped printing medium R, on which a printing subject S is printed by the printer 120.

The communicator 160 receives data indicating a printing subject S from the terminal device 200. The communicator 160 includes a wireless communication module, such as a wireless local area network (LAN) and Bluetooth (registered trademark).

The ROM 170 includes a nonvolatile memory, such as a flash memory, and stores programs for the controller 110 to achieve various types of functions as described above. The RAM 180 includes a volatile memory and is used as a working area for the controller 110 to execute programs to perform various types of processing. In addition, the RAM 180 stores information of image data of a printing subject S and the like.

Figure 8:
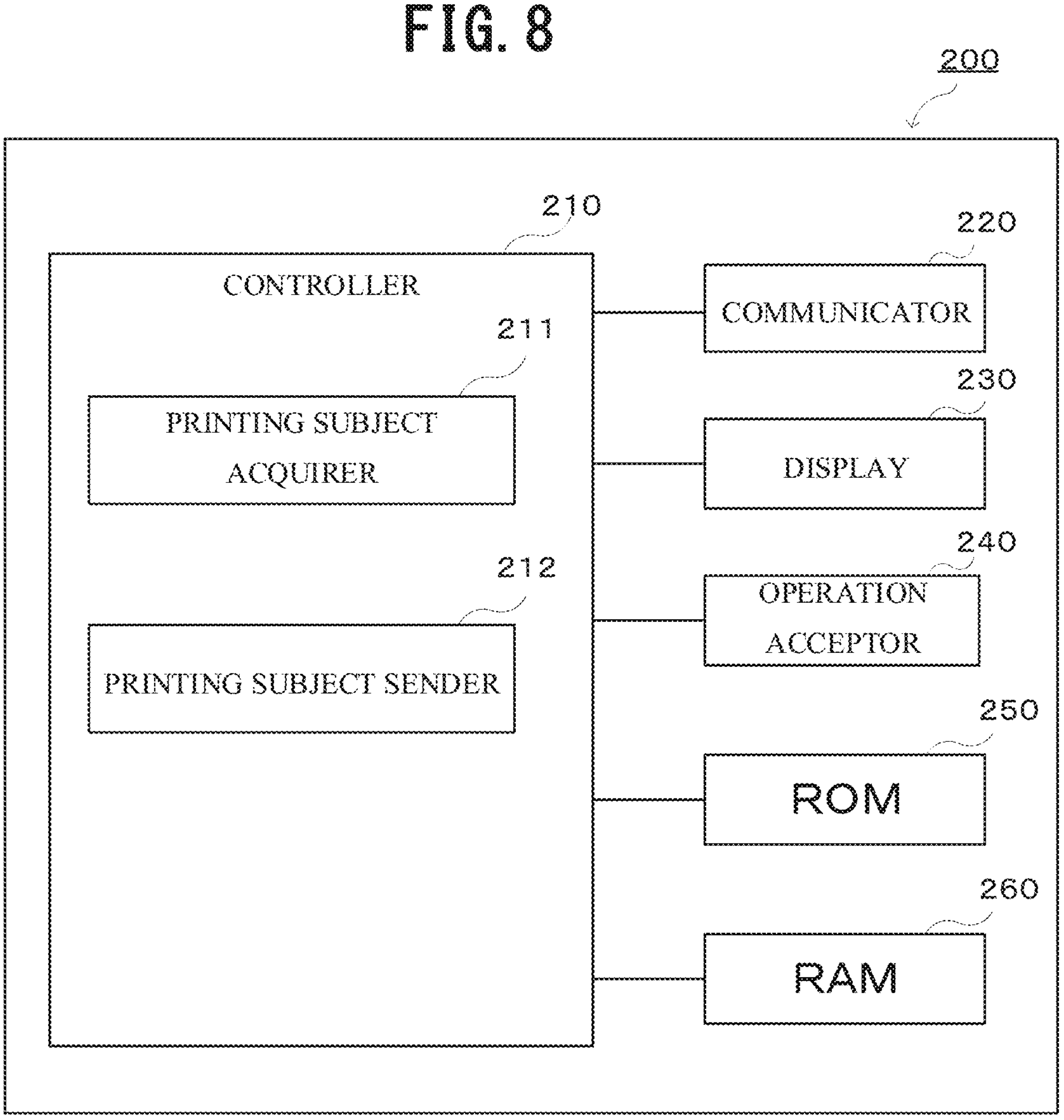
FIG. 8 is a block diagram illustrating a configuration of a terminal device according to the embodiment of the present disclosure.

The terminal device 200 includes, as illustrated in FIG. 8, a controller 210, a communicator 220, the display 230, an operation acceptor 240, a ROM 250, and a RAM 260.

The controller 210 includes a CPU and the like. The controller 210 functions as a printing subject acquirer 211 and a printing subject sender 212 by executing programs stored in the ROM 250.

The printing subject acquirer 211 acquires data indicating a printing subject S that the operation acceptor 240 accepted or the communicator 220 received.

The printing subject sender 212 sends, via the communicator 220, data of a printing subject S to the printing device 100. In addition, when a user operates the terminal device 200 and an instruction to start printing is executed, the printing subject sender 212 sends data indicating the instruction to start printing to the printing device 100. In addition, when the user operates the terminal device 200 and an instruction to replace a cartridge is executed, the printing subject sender 212 sends data indicating the instruction to replace a cartridge to the printing device 100.

The communicator 220 sends data indicating a printing subject S and data indicating an instruction to start printing to the printing device 100. The communicator 220, as with the above-described communicator 160, includes a wireless communication module, such as a wireless LAN and Bluetooth (registered trademark).

The display 230 is a device that displays an image required for operation, and includes a liquid crystal display (LCD) or the like.

The operation acceptor 240 accepts, based on user input, data of a printing subject S and instructions to start printing processing, start printing, finish printing, and replace a cartridge. Note that the operation acceptor 240 and the display 230 constitute a touch panel display device.

The ROM 250 includes a nonvolatile memory, such as a flash memory, and stores programs for the controller 110 to achieve various types of functions. The RAM 260 includes a volatile memory, is used as a working area for the controller 110 to execute programs to perform various types of processing, and stores data indicating a printing subject S.

Next, printing processing that the printing device 100 executes is described.

Figure 9:
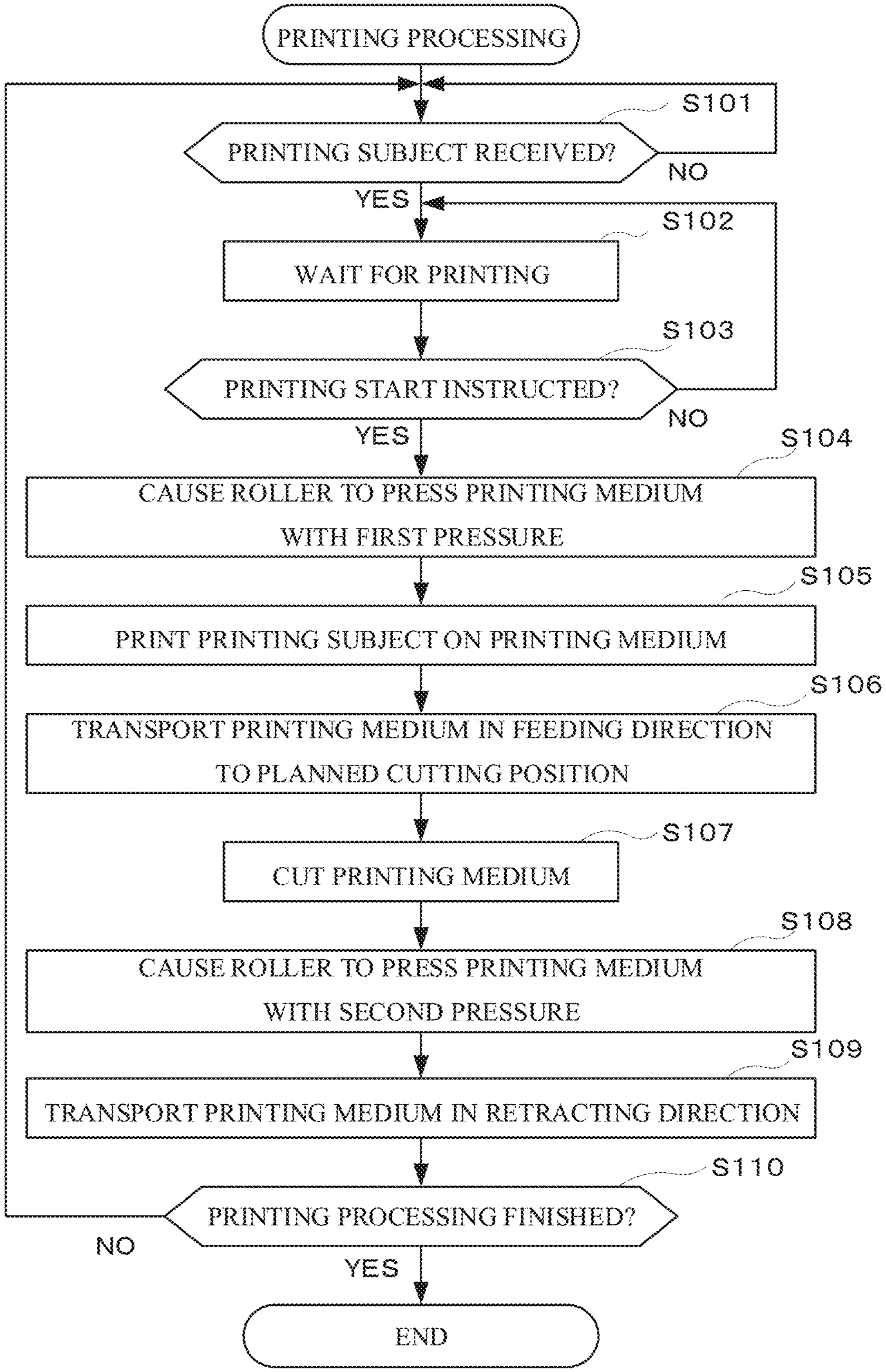
FIG. 9 is a flowchart illustrating printing processing that the printing device according to the embodiment of the present disclosure executes.

In response to an instruction to start printing processing from a user, the printing device 100 starts the printing processing illustrated in FIG. 9.

First, the printing subject acquirer 111 waits while being able to receive data indicating a printing subject S and determines whether or not having received data indicating a printing subject S (step S101). When the printing subject acquirer 111 has not received data indicating a printing subject (step S101; No), the printing subject acquirer 111 repeats step S101.

When, by user operation, a printing subject S is input to the terminal device 200 and the printing subject S is sent from the terminal device 200 to the printing device 100, the printing subject acquirer 111 receives data indicating the printing subject S (step S101; Yes). When receiving the printing subject S, the printing subject acquirer 111 causes the RAM 180 to store the data indicating the printing subject S and waits while being able to start printing when start of printing is instructed by the user (step S102).

Next, the transport controller 113 determines whether or not an instruction to start printing is executed through user operation of the terminal device 200 (step S103). When the transport controller 113 determines that the instruction to start printing has not been executed (step S103; No), the transport controller 113 returns to step S102 and repeats steps S102 and S103.

When the transport controller 113 determines that the instruction to start printing is executed (step S103; Yes), the transport controller 113 controls the presser 140 to cause the roller 131 to press the printing medium R against the printing head 121 with the first pressure (step S104). Specifically, the transport controller 113 controls the presser 140 to rotate the cam 141 to a position at which the first cam surface 141*a* comes into contact with the contacting portion 142*a* of the cam follower 142, as illustrated in FIG. 3. By the roller 131 that is, because of this positioning of the cam 141, biased by the elastic body 143 arranged between the cam follower 142 and the roller axial support 132*b*, the printing medium R is pressed against the printing head 121 with the first pressure.

Figure 10:
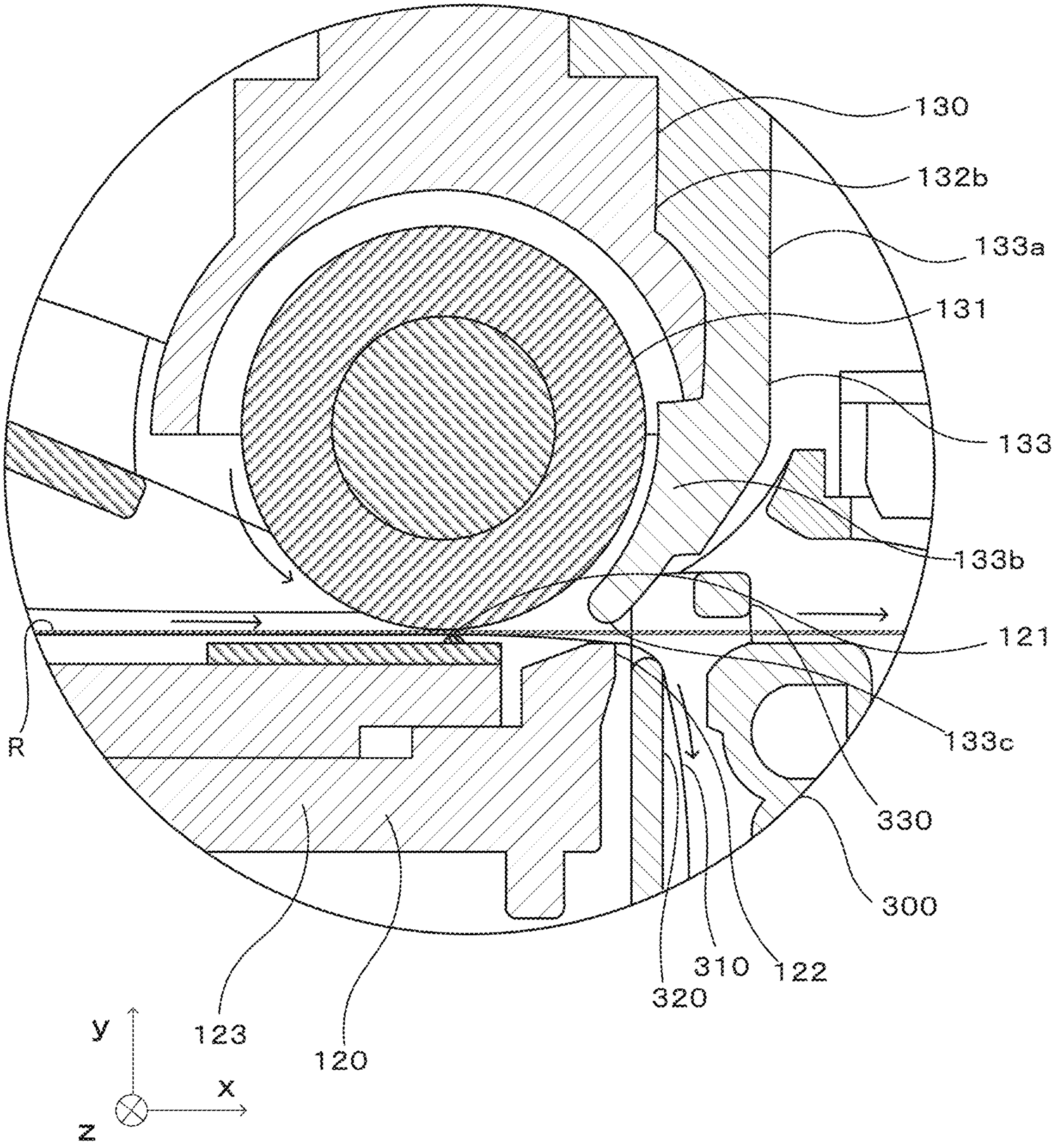
FIG. 10 is a cross-sectional view describing operation of the printing device according to the embodiment of the present disclosure (part 1)

Next, as illustrated in FIG. 10, the printing head controller 112 controls, based on a transport distance by which the transporter 130 controlled by the transport controller 113 has transported the printing medium R in the feeding direction, the printer 120 to print the printing subject S on the printing medium R (step S105). Specifically, every time the printing medium R is transported in the sub-scan direction by a distance equivalent to one dot pitch, the printing head controller 112 causes the printing head 121 to print one dot line, which is a line of pixels that are arranged in a line shape in the main-scan direction, in the image of the printing subject S stored in the RAM 180.

Next, after the printer 120 has printed the printing subject S on the printing medium R, the transport controller 113 controls the transporter 130 to transport the printing medium R in the feeding direction until a planned cutting position of the printing medium R is arranged at the location of the cutting blade of the cutter 150 (step S106).

Next, the transport controller 113 controls the cutter 150 to cut the printing medium R at the planned cutting position (step S107).

Next, the transport controller 113 controls the presser 140 to cause the roller 131 to press the printing medium R against the printing head 121 with the second pressure (step S108). Specifically, the transport controller 113 controls the presser 140 to rotate the cam 141 to a position at which the second cam surface 141*b* comes into contact with the contacting portion 142*a* of the cam follower 142, as illustrated in FIG. 5. By the roller 131 that is, because of this positioning of the cam 141, biased by the elastic body 143 arranged between the cam follower 142 and the roller axial support 132*b*, the printing medium R is pressed against the printing head 121 with the second pressure.

Figure 11:
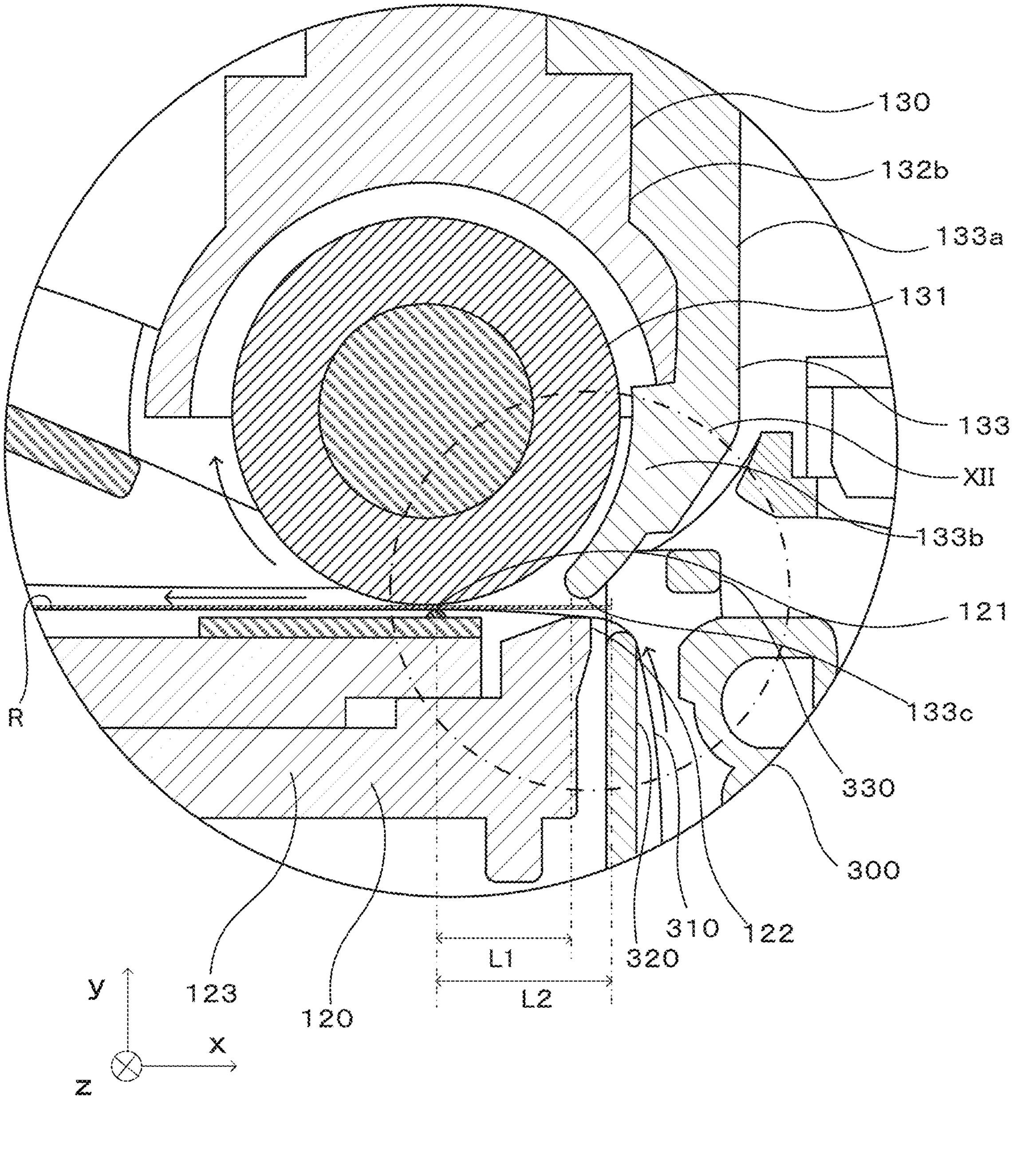
FIG. 11 is another cross-sectional view describing the operation of the printing device according to the embodiment of the present disclosure (part 2)
Figure 12:
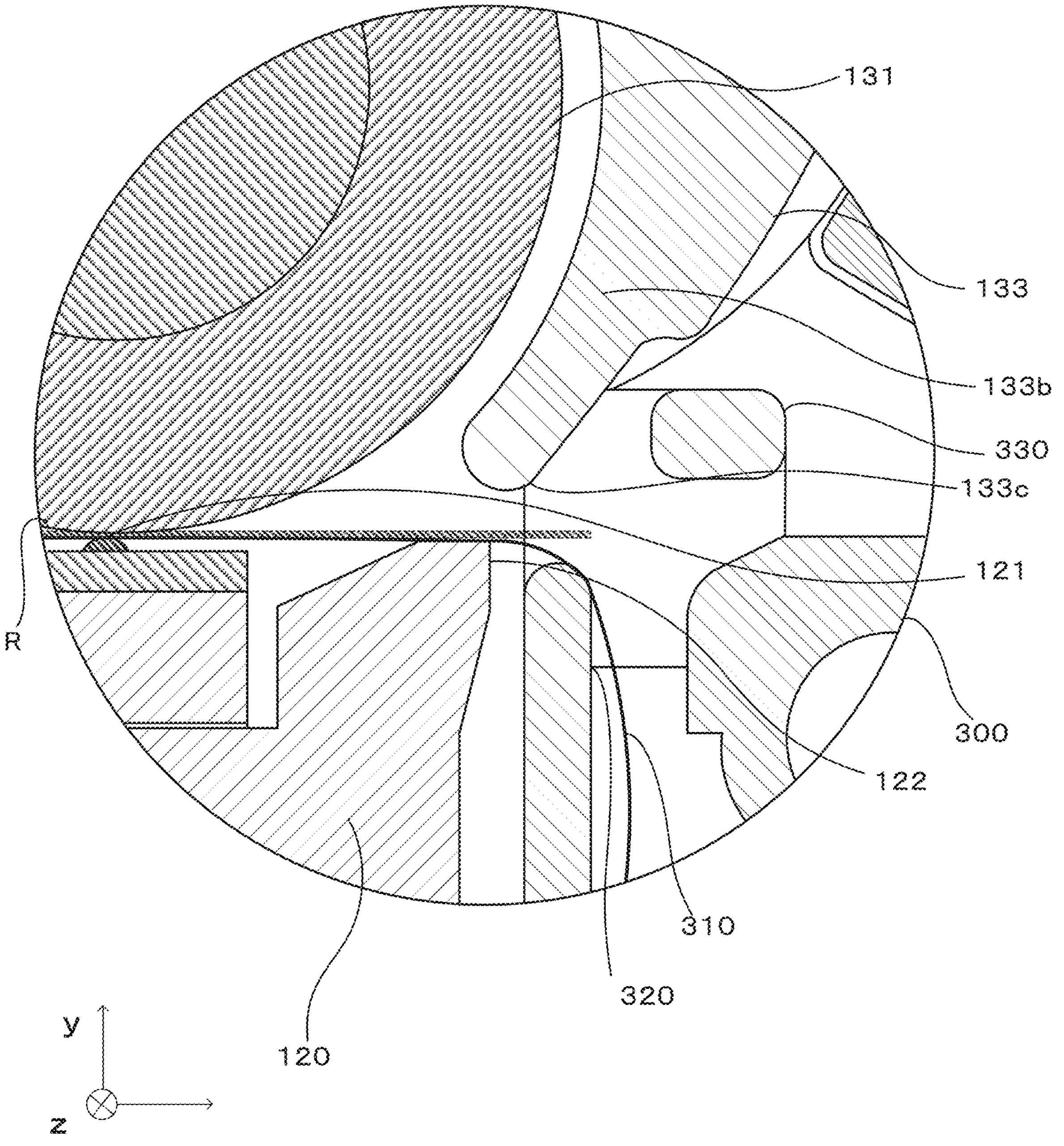
FIG. 12 is an enlarged cross-sectional view of a part XII of FIG. 11.

Next, the transport controller 113 controls the transporter 130 to transport the printing medium R in the retracting direction (step S109). The transporter 130 preferably transports the printing medium R in the retracting direction to a location at which the tip portion of the printing medium R, on which printing is to be performed, is arranged at a location between the tape guide 133 and the cutter 150 and in the vicinity of the tape guide 133, as illustrated in FIGS. 11 and 12. Length L2 from the printing head 121 to the tip portion of the printing medium R is, for example, 6 mm. On this occasion, since the tip portion of the printing medium R is located between the tip portion 133*c* of the tape guide 133 and the lower guide 122, the printing medium R and the ribbon 310 are prevented from bending. When the printing medium R is transported in the feeding direction again, this configuration can prevent the tip portion of the printing medium R from coming into contact with a rib 320 or a cartridge claw 330 of the cartridge 300.

Next, the transport controller 113 determines whether or not an instruction to finish the printing processing has been accepted (step S110). When no instruction to finish the printing processing has been accepted (step S110; No), the transport controller 113 returns to step S101 and repeats steps S101 to S110. Returning to step S101, when printing is to be performed on the printing medium R again, the printing medium R has been transported in the retracting direction in step S109, and it is thus possible to reduce a margin to be produced between the tip portion of the printing medium R and the printing head 121.

When an instruction to finish the printing processing is accepted (step S110; Yes), the printing device 100 terminates the printing processing.

Next, cartridge replacement processing that the printing device 100 executes is described.

Figure 13:
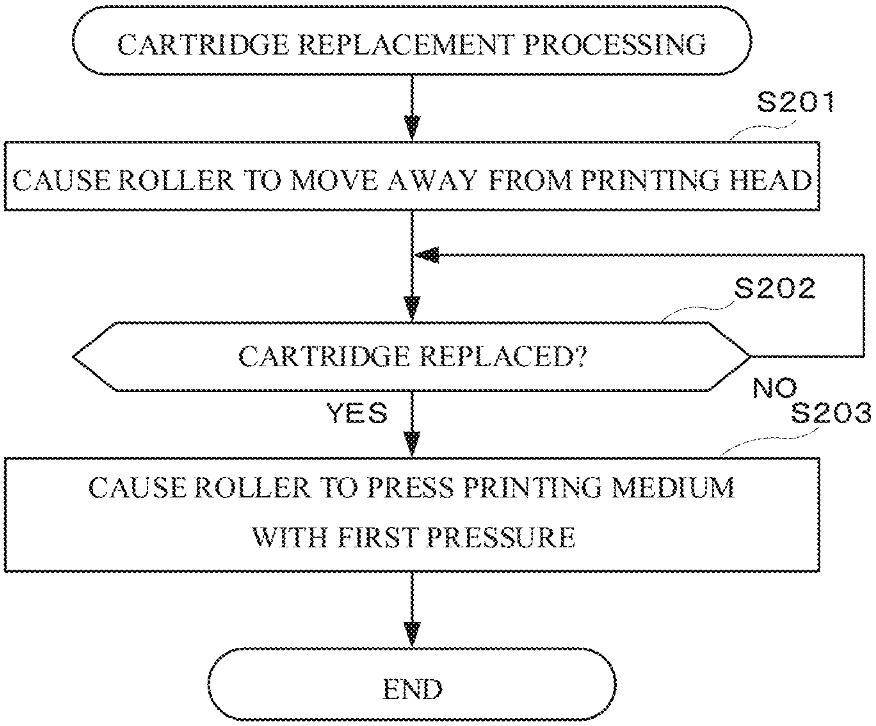
FIG. 13 is a flowchart illustrating cartridge replacement processing that the printing device according to the embodiment of the present disclosure executes.

In response to an instruction to start the cartridge replacement processing from the user, the printing device 100 starts the cartridge replacement processing illustrated in FIG. 13. Note that the cartridge replacement processing may be started in response to detection, by a sensor or the like, of, for example, a cover of the cartridge housing 101 being opened.

Figure 14:
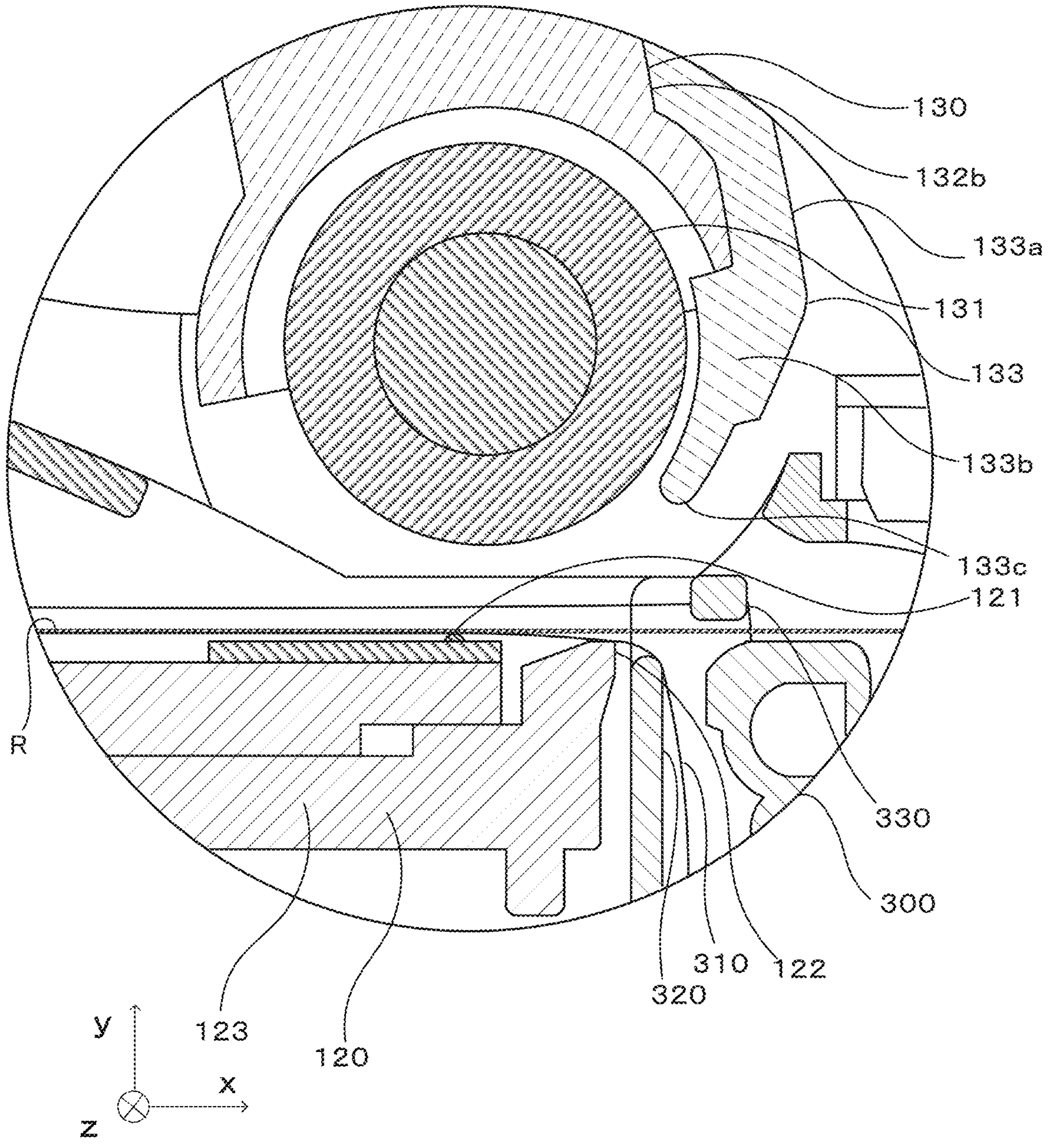
FIG. 14 is another cross-sectional view describing the operation of the printing device according to the embodiment of the present disclosure (part 3).

When the cartridge replacement processing is started, the transport controller 113 controls the presser 140 to cause the roller 131 to move away from the printing head 121 (step S201). Specifically, the transport controller 113 controls the presser 140 to rotate the cam 141 to a position at which the contacting portion 142*a* of the cam follower 142 comes into contact with the third cam surface 141*c*, as illustrated in FIG. 6. This positioning of the cam 141 causes the fitted portion 142*b* of the cam follower 142 to be fitted to the fitting portion 141*d* of the cam 141 and the roller 131 to move away from the printing head 121. Since the tape guide 133 is, as illustrated in FIG. 14, arranged at a location that is fixed with respect to the roller 131, when the roller 131 moves away from the printing head 121, the tape guide 133 also moves away from the printing head 121 and does not hinder replacement of the cartridge 300.

Next, the transport controller 113 determines whether or not the cartridge has been replaced by the user (step S202). Whether or not the cartridge has been replaced may be determined by detecting, by the sensor or the like, that the cover of the cartridge housing 101 has been closed. When the cartridge has not been replaced by the user (step S202; No), the transport controller 113 repeats step S202.

When the cartridge has been replaced by the user (step S202; Yes), the transport controller 113 controls the presser 140 to cause the roller 131 to press the printing medium R against the printing head 121 with the first pressure (step S203). On this occasion, since the tape guide 133 is arranged at a location that is fixed with respect to the roller 131, when the roller 131 is pressed against the printing head 121, the tip portion 133*c* of the tape guide 133 is arranged in the vicinity of the lower guide 122. Subsequently, the transport controller 113 terminates the cartridge replacement processing.

As described above, according to the printing system 1 and the printing device 100 of the present embodiment, performing printing while pressing the printing medium R with the first pressure enables a printing subject S to be clearly printed on the printing medium R. In addition, when the printing medium R is transported in the retracting direction, the roller 131 pressing the printing medium R against the printing head 121 with the second pressure, which is smaller than the first pressure, enables a load on the printing medium R and the ribbon 310 at the time of transportation to be suppressed and stable transportation to be achieved. As a result, reducing a load on the printing medium R and the ribbon 310 enables ribbon wrinkles and ribbon breakage to be prevented from occurring. In addition, after cutting the printing medium R on which a printing subject S is printed, the transporter 130 transporting the printing medium R on which printing is to be performed in the retracting direction enables printing to be performed on the tape-shaped printing medium R with a small margin. Specifically, the transporter 130 transporting the printing medium R on which printing is to be performed in the retracting direction to a location at which the tip portion of the printing medium R is arranged at a location between the tape guide 133 and the cutter 150 and in the vicinity of the tape guide 133 enables distance by which the printing medium R is transported in the retracting direction to be set large and printing to be performed on the tape-shaped printing medium R with a small margin. In addition, the transporter 130 including the tape guide 133 enables the tape guide 133 to prevent the printing medium R from bending and the tip portion of the printing medium R from coming into contact with the rib 320 or the cartridge claw 330 of the cartridge 300. In addition, since the tape guide 133 is arranged at a location that is fixed with respect to the roller 131, movement of the tape guide 133 is synchronized with ascent and descent of the roller 131, and, when the roller 131 moves away from the printing head 121, the tape guide 133 also moves away from the printing head 121 and does not hinder replacement of the cartridge 300. The printing device 100 has a structure in which the roller 131 of the transporter 130 is movable, and the printing head 121 is attached to the fixing portion 123, which is made of metal by aluminum die-casting or the like. This configuration can prevent the printing head 121 from tilting and a portion of an image on one side of the printing medium R from being lightly printed.

(Variations)

With regard to the printing device 100 of the above-described embodiment, an example in which the presser 140 includes the cam 141 and the cam follower 142, which is moved by the cam 141, was described. The presser 140 is only required to cause the roller 131 to press the printing medium R against the printing head 121 with the first pressure or the second pressure, which is smaller than the first pressure, and cause the roller 131 to move away, and may have a structure other than the cam structure, such as a structure using a linear motor and a structure using fluid pressure like oil pressure or air pressure.

With regard to the printing device 100 of the above-described embodiment, an example in which the presser 140 causes the roller 131 to press the printing medium R against the printing head 121 with the first pressure or the second pressure, which is smaller than the first pressure, was described. When the presser 140 causes the roller 131 to press the printing medium R against the printing head 121, it is only required to reduce a load on the printing medium R and the ribbon 310. The second pressure is only required to be different from the first pressure and may be larger than the first pressure. The first pressure and the second pressure are determined based on characteristics of the printing medium R and the ribbon 310 and the like.

With regard to the printing device 100 of the above-described embodiment, an example in which the printing device 100 is a thermal transfer type printer that transfers ink applied to a ribbon onto the printing medium R by heat was described. The printing device 100 is only required to be a printer the printing head 121 of which is a print head capable of thermal transfer, and may be a thermal printer that, in place of transferring ink applied to a ribbon onto the printing medium R by heat, performs printing on a thermal paper that senses heat and changes its color. In this case, since no ribbon is required, it is possible to reduce running cost. It is also possible to perform printing on a thermal paper like a receipt printed by a cash register.

With regard to the printing system 1 of the above-described embodiment, an example in which the printing system 1 includes the printing device 100 and the terminal device 200 was described. The printing device 100 may be a printing device that includes a display and an operation acceptor and is capable of printing a printing subject S on a printing medium R alone without the terminal device 200.

A main part of printing assistance processing that the terminal device 200, which includes the CPU, the RAM, the ROM, and the like, performs can be performed using a general information mobile terminal (such as a smartphone and a tablet PC), personal computer, or the like instead of using a dedicated system. For example, an information terminal that performs the above-described processing may be configured by storing a computer program for performing the above-described processing in a computer-readable recording medium (a flexible disk, a compact disc read only memory (CD-ROM), a digital versatile disc read only memory (DVD-ROM), or the like), distributing the recording medium, and installing the computer program into an information mobile terminal or the like. An information processing device may be configured by storing the computer program in a storage device that a server device on a communication network, such as the Internet, has and a general information processing terminal or the like downloading the program.

When the function of the printing assistance device is to be achieved through sharing of the functions by an operating system (OS) and an application program or collaboration between the OS and the application program, only the application program part may be stored in a recording medium or a storage device.

It is also possible to superimpose a computer program on a carrier wave and distribute the computer program via a communication network. For example, the computer program may be posted on a bulletin board system (BBS) on the communication network, and the computer program may be distributed via the network. The above-described processing may be configured to be able to be performed by starting up and executing the distributed computer program in a similar manner to other application programs under the control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A printing device comprising:

a printer including a printing head to print a printing subject on a printing medium;

a transporter including a roller to, while pressing the printing medium against the printing head, transport the printing medium in a feeding direction and a retracting direction; and a presser to, when the printing medium is transported in a feeding direction, cause the roller to press the printing medium against a predetermined portion of the printing head with first pressure, and when the printing medium is transported in a retracting direction, cause the roller to press the printing medium against the same predetermined portion of the printing head with second pressure different from the first pressure, whereby the presser causes the roller to press the printing medium against the same predetermined portion of the printing head with both the first pressure and the second pressure.

2. The printing device according to claim 1, further comprising a cutter to cut the printing medium, wherein the presser, in response to the cutter having cut the printing medium, causes the roller to press the printing medium against the predetermined portion of the printing head with the second pressure.

3. The printing device according to claim 2, wherein the presser includes a cam including a first cam surface and a second cam surface, a cam follower moved by the cam, a roller support to support the roller, and an elastic body arranged between the cam follower and the roller support, and when the first cam surface presses the cam follower, the cam follower presses the elastic body, the roller support is biased by the elastic body, and the roller presses the printing medium against the predetermined portion of the printing head with the first pressure, and when the second cam surface presses the cam follower, the cam follower presses the elastic body, the roller support is biased by the elastic body, and the roller presses the printing medium against the predetermined portion of the printing head with the second pressure.

4. The printing device according to claim 3, further comprising an actuator to rotate the cam, wherein, by the actuator operating, a cam surface that is to press the cam follower is switched between the first cam surface and the second cam surface.

5. The printing device according to claim 2, further comprising a tape guide arranged at a location on a forward side in a feeding direction of the roller and in a vicinity of the roller and configured to prevent the printing medium from bending.

6. The printing device according to claim 5, wherein the tape guide is arranged at a location that is fixed with respect to the roller, and when the presser causes the roller to move away from the printing head, the tape guide moves away from the printing head in conjunction with the roller.

7. The printing device according to claim 5, wherein a tip portion of the tape guide is arranged at a location at which, when the printing medium bends, a tip portion of the tape guide and the printing medium come into contact with each other.

8. A printing device comprising a printer including a printing head to print a printing subject on a printing medium;

a transporter including a roller to, while pressing the printing medium against the printing head, transport the printing medium in a feeding direction and a retracting direction; and a presser to, when the printing medium is transported in a feeding direction, cause the roller to press the printing medium against the printing head with first pressure, and when the printing medium is transported in a retracting direction, cause the roller to press the printing medium against the printing head with second pressure different from the first pressure, wherein the presser includes a cam including a first cam surface and a second cam surface, a cam follower moved by the cam, a roller support to support the roller, and an elastic body arranged between the cam follower and the roller support, when the first cam surface presses the cam follower, the cam follower presses the elastic body, the roller support is biased by the elastic body, and the roller presses the printing medium against the printing head with the first pressure, and when the second cam surface presses the cam follower, the cam follower presses the elastic body, the roller support is biased by the elastic body, and the roller presses the printing medium against the printing head with the second pressure.

9. The printing device according to claim 8, further comprising an actuator to rotate the cam, wherein, by the actuator operating, a cam surface that is to press the cam follower is switched between the first cam surface and the second cam surface.

10. A printing device comprising:

a printer including a printing head to print a printing subject on a printing medium;

a transporter including a roller to, while pressing the printing medium against the printing head, transport the printing medium in a feeding direction and a retracting direction;

a presser to, when the printing medium is transported in a feeding direction, cause the roller to press the printing medium against the printing head with first pressure, and when the printing medium is transported in a retracting direction, cause the roller to press the printing medium against the printing head with second pressure different from the first pressure;

a cutter to cut the printing medium; and a tape guide arranged at a location on a forward side in a feeding direction of the roller and in a vicinity of the roller and configured to prevent the printing medium from bending;

wherein the presser, in response to the cutter having cut the printing medium, causes the roller to press the printing medium against the printing head with the second pressure, and wherein, when the cutter cuts the printing medium, the transporter transports the printing medium in a retracting direction and arranges a tip portion of the printing medium on which printing is to be performed at a location between the tape guide and the cutter and in a vicinity of the tape guide.

11. A printing method for performing printing using a printing device including:

a printer including a printing head to print a printing subject on a printing medium; and a transporter including a roller to, while pressing the printing medium against the printing head, transport the printing medium in a feeding direction and a retracting direction, the printing method comprising:

when the printing medium is transported in a feeding direction, causing the roller to press the printing medium against a predetermined portion of the printing head with first pressure; and when the printing medium is transported in a retracting direction, causing the roller to press the printing medium against the same predetermined portion the printing head with second pressure different from the first pressure, whereby the presser causes the roller to press the printing medium against the same predetermined portion of the printing head with both the first pressure and the second pressure.

* * * * *